United States Patent
Daito

(10) Patent No.: US 7,669,324 B2
(45) Date of Patent: Mar. 2, 2010

(54) WATER STOPPING METHOD, WIRE HARNESS PROCESSED BY THE WATER STOPPING METHOD AND WATER STOPPING APPARATUS

(75) Inventor: Koji Daito, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/021,528

(22) Filed: Jan. 29, 2008

(65) Prior Publication Data

US 2008/0185169 A1    Aug. 7, 2008

(30) Foreign Application Priority Data

Jan. 29, 2007    (JP) .............................. 2007-018084

(51) Int. Cl.
*H01B 7/285*    (2006.01)
*H01B 7/00*    (2006.01)
(52) U.S. Cl. .......................... 29/861; 174/78; 425/116; 425/127
(58) Field of Classification Search ............... 29/861; 174/78; 425/116, 127
See application file for complete search history.

(56) References Cited

U.S. PATENT DOCUMENTS

| | | |
|---|---|---|
| 4,129,466 A | 12/1978 | Portinari et al. |
| 4,822,434 A | 4/1989 | Sawaki et al. |
| 6,517,381 B2 | 2/2003 | Kondo |
| 6,761,551 B2 * | 7/2004 | Kondo ..................... 425/116 |

FOREIGN PATENT DOCUMENTS

| | | |
|---|---|---|
| DE | 25 23 190 A1 | 12/1975 |
| DE | 37 41 943 C2 | 6/1989 |
| DE | 43 21 044 A1 | 1/1995 |
| JP | 11-234883 A | 8/1999 |
| JP | 2004-355851 A | 12/2004 |
| JP | 2006-202697 A | 8/2006 |
| JP | 2006-221880 A | 8/2006 |
| JP | 2006-228709 A | 8/2006 |
| WO | 95/00364 A1 | 1/1995 |

OTHER PUBLICATIONS

Translation of German Office Action dated Sep. 21, 2009.

* cited by examiner

*Primary Examiner*—Derris H Banks
*Assistant Examiner*—Dan D Le
(74) *Attorney, Agent, or Firm*—Sughrue Mion, PLLC

(57) ABSTRACT

A water stopping apparatus for causing a water stopping material to penetrate exposed core wires of a sheathed wire forming a wire harness includes a pair of dies which can abut against each other in a mutually opposed condition, thereby forming a pressurizing space in which an exposed portion of the core wires of the wire harness can be mounted, a filling portion for filling a water stopping material in the pressurizing space in which the exposed portion of the core wires is mounted, and a pressurizing portion for supplying pressurized gas into the pressurizing space to pressurize the same.

8 Claims, 9 Drawing Sheets

WATER STOPPING METHOD, WIRE HARNESS PROCESSED BY THE WATER STOPPING METHOD AND WATER STOPPING APPARATUS

BACKGROUND

The present invention relates to a water stopping method used for effecting water stopping between core wires of a sheathed wire of a wire harness, a wire harness processed by the water stopping method, and a water stopping apparatus. Incidentally, "water stopping" in the description of the present invention is not limited to the prevention of intrusion of water, but means that it effectively acts on a liquid containing water, oil, alcohol, etc., as a whole, and here description will be made using "water stopping" generally extensively used as a designation.

As a water stopping method, there is a method in which exposed core wires are immersed in a water stopping material and are filled with it (for example, see Patent Literature 1), and particularly as a method of causing a water stopping material to satisfactorily penetrate core wires, there is known one in which the air is drawn during the supply of a water stopping material or after the supply so as to reduce the pressure, thereby causing the water stopping material to penetrate into the inside of an insulating sheath (for example, see Patent Literatures 2 to 5).

As shown in FIG. 9, a sheathed wire (ground wire) 51 used in the water stopping method disclosed in the above Patent Literature 1 has an insulating sheath (sheathing material) 54 around its core wires (conductors) 53, and a terminal (ground connection terminal) 52 is press-clamped (that is, press-fastened) to one of end portions thereof.

For press-clamping the terminal 52 to the sheathed wire 51, a pair of barrels 55 of the terminal 52 are opened, and the end portion of the sheathed wire 51 where the core wires 53 have been exposed by removing the insulating sheath 54 is set on a surface between the barrels 55 of the terminal 52, and then the barrels 55 are press-fastened to be closed, thereby fixing the core wires 53 and the insulating sheath 54 to the terminal 52 by press-clamping.

In the water stopping method used for effecting water stopping between the core wires 53 of such sheathed wire 51 with the terminal 52, while effecting the pressure reducing step of drawing the air within the insulating sheath 54 from the other of the end portions of the sheathed wire 51, the water stopping material having fluidity is supplied to the one of the end portions of the sheathed wire 51 in a direction 60 of an arrow, and the water stopping material is caused to penetrate into the inside of the insulating sheath 54.

In the above water stopping method, there is adopted the vacuum pressure-reducing system for reducing the pressure by drawing the air, and therefore at the most the pressure difference more than the atmospheric pressure (1 kgf/cm$^2$) can not be obtained. Therefore, because of the decrease of interstices between the core wires due to a small-diameter design, a lightweight design, etc., of the sheathed wire, there has been a limit to the penetration of the water stopping material.

Furthermore, it is difficult to reduce the volume of the water stopping material penetrating between the core wires.

Furthermore, at one end portions or intermediate joint portions of a plurality of sheathed wires where core wires of the plurality of sheathed wires are joined and connected together, a massive facility is required for drawing the air within a plurality of insulating sheaths from a plurality of other end portions, and therefore not only a large working space is required, but also a large facility investment is involved.

Furthermore, in the case where the sheathed wire 51 has a large diameter or in the case where a plurality of sheathed wires 51 are bundled together, the amount of the water stopping material to be used increases, and therefore the water stopping material must be additionally supplied, and besides the end portions of the core wires 53 can not completely be covered with the water stopping material, and there develop areas where the water stop material does not reach the core wires 53 of the sheathed wire 51, so that the water stopping effect is insufficient.

Furthermore, there are occasions when the water stopping material dropped on the end portions of the core wires 53 drips therefrom, and a cumbersome operation must be carried out for removing the dripped water stopping material.

Furthermore, when the water stopping material deposits on a bolt fastening plate which is to be bolt-fastened as a contact of the terminal 52, there is a fear that a defective conduction may develop at the terminal 52.

[Patent Literature 1] JP-A-11-234883
[Patent Literature 2] JP-A-2004-355851
[Patent Literature 3] JP-A-2006-202697
[Patent Literature 4] JP-A-2006-221880
[Patent Literature 5] JP-A-2006-228709

SUMMARY OF THE INVENTION

The present invention has been made in view of the above circumstances, and an object thereof is to provide a water stopping method, a wire harness and a water stopping apparatus which can solve the above problems.

In order to achieve the above-mentioned object, a water stopping method according to the present invention is characterized by (1) to (5) mentioned below.

(1) A water stopping method of causing a water stopping material to penetrate exposed core wires of a sheathed wire forming a wire harness, comprising:

arranging a portion of the wire harness between a pair of dies opposed to each other, and holding the portion of the wire harness between the pair of dies to seal an exposed portion of the core wires arranged within a pressurizing space formed between the dies;

filling the water stopping material in the pressurizing space; and pressurizing the interior of the pressurizing space.

(2) The water stopping method of the above (1), wherein after the pressurizing process, the excess water stopping material within the pressurizing space is discharged.

(3) The water stopping method of the above (1) or (2), wherein before the sealing process, a terminal is press-clamped to the exposed portion of the core wires of the sheathed wire.

(4) The water stopping method of the above (3), wherein in the sealing process, the terminal is arranged within the pressurizing space, and other portion of the terminal than the portion thereof press-clamped to the exposed portion of the core wires is hermetically sealed.

(5) The water stopping method of the above (4), wherein a sealing material is adhered to the other portion of the terminal than the portion thereof press-clamped to the exposed portion of the core wires to hermetically seal the other portion.

In the water stopping method of the above (1), part of the wire harness is held between the pair of dies opposed to each other, and the exposed portion of the core wires is arranged within the pressurizing space formed between the dies, and is sealed, and the water stopping material is filled in this pressurizing space, and further the interior of the pressurizing space is pressurized, and therefore the periphery of the exposed portion of the core wires is covered with the water stopping material filled in the pressurizing space, and this water stopping material is pressurized, and can be caused to positively forcibly penetrate the wire cores.

Therefore, even in the case where the sheathed wire has a large diameter or in the case where a plurality of sheathed wires are bundled together, the water stopping material can be caused to sufficiently penetrate without additionally supplying the water stopping material and without inviting a disadvantage that there develops an area where the water stopping material does not reach the core wires, and the good water stopping effect can be obtained.

Furthermore, the water stopping material supplied to the exposed portion of the core wires will not drip therefrom, and therefore a cumbersome operation for removing such dripped water stopping material can be made unnecessary.

Furthermore, the water stopping material is caused to forcibly penetrate the core wires by pressurizing, and therefore the water stopping material can be caused to satisfactorily penetrate even if a facility is not massive, and the facility cost can be reduced. Particularly, the water stopping material of high viscosity can be caused to positively penetrate between the core wires by pressurizing, and therefore even before the water stopping material is completely cured, the process can shift to the next step, and the productivity can be enhanced.

In the water stopping method of the above (2), after the water stopping material is caused to penetrate the core wires by pressurizing the interior of the pressurizing space, the excess water stopping material within the pressurizing space is discharged, and therefore a cumbersome operation for removing the excess water stopping material by wiping after the water stopping material is caused to penetrate the core wires can be made unnecessary, and the efficiency of the water stopping operation can be enhanced, and also a resources-saving design can be achieved.

In the water stopping method of the above (3), the water stopping material can be caused to positively penetrate between the core wires of the sheathed wire from the exposed portion of the core wires to which the terminal is press-clamped, and the wire harness having the good water stopping effect can be provided.

In the water stopping method of the above (4), the terminal is located within the pressurizing space, and other portion of the terminal than the portion thereof press-clamped to the exposed portion of the core wires is hermetically sealed, and therefore the water stopping material can be prevented from depositing on a bolt fastening plate to be bolt fastened as a contact of the terminal, etc., and the good water stopping performance can be imparted while maintaining a good conducting condition of the terminal.

In the water stopping method of the above (5), the sealing material is brought into intimate contact with the other portion of the terminal than the portion thereof press-clamped to the exposed portion of the core wires to thereby hermetically seal the other portion, and therefore the water stopping material can be easily and positively prevented from depositing on the bolt fastening plate to be bolt fastened as the contact of the terminal, etc.

In order to achieve the above-mentioned object, a wire harness according to the present invention is characterized by (6) mentioned below.

(6) A wire harness wherein with the water stopping method of the above (1) to (5), the water stopping of the exposed portion of the core wires to which the terminal is press-clamped is effected by the water stopping material.

In the wire harness of the above (6), there can be provided the wire harness of high quality and safety in which the water stopping of the exposed portion of the core wires at the end portion is positively effected by the water stopping material.

In order to achieve the above-mentioned object, a water stopping apparatus according to the present invention is characterized by (7) to (10) mentioned below.

(7) A water stopping apparatus for causing a water stopping material to penetrate exposed core wires of a sheathed wire forming a wire harness, comprising:

a pair of dies which is configured to form a pressurizing space in which an exposed portion of the core wires of the wire harness is mounted when the pair of dies abut against each other in a mutually opposed condition;

a filling portion which fills the water stopping material in the pressurizing space in which the exposed portion of the core wires is mounted; and a pressurizing portion which supplies pressurized gas into the pressurizing space to pressurize.

(8) The water stopping apparatus of the above (7), further comprising a discharge portion which discharges the excess water stopping material within the pressurizing space.

(9) The water stopping apparatus of the above (7) or (8), wherein a terminal is press-clamped to the exposed portion of the core wires, and the apparatus further comprises a sealing material which is adhered to other portion of the terminal than the portion thereof press-clamped to the exposed portion of the core wires to hermetically seal the other portion.

(10) The water stopping apparatus of the above (7) to (9), wherein a positioning pin for passing through a fixing hole formed in a terminal press-clamped to the exposed portion of the core wires is formed on one of the pair of dies.

In the water stopping apparatus of the above (7), part of the wire harness is held between the pair of dies opposed to each other, and the exposed portion of the core wires is located within the pressurizing space formed between the dies, and is sealed, and the water stopping material is filled in this pressurizing space, and further the interior of the pressurizing space is pressurized, and by doing so, the periphery of the exposed portion of the core wires is covered with the water stopping material filled in the pressurizing space, and this water stopping material is pressurized, and can be caused to positively forcibly penetrate the wire cores.

Therefore, even in the case where the sheathed wire has the large diameter or in the case where a plurality of sheathed wires are bundled together, the water stopping material can be caused to sufficiently penetrate without additionally supplying the water stopping material and without inviting a disadvantage that there develops an area where the water stopping material does not reach the core wires, and the good water stopping effect can be obtained.

Furthermore, the water stopping material supplied to the exposed portion of the core wires will not drip therefrom, and therefore a cumbersome operation for removing such dripped water stopping material can be made unnecessary.

Furthermore, the water stopping material is caused to forcibly penetrate the core wires by pressurizing, and therefore the water stopping material can be caused to satisfactorily penetrate even if the facility is not massive, and the facility cost can be reduced. Particularly, the water stopping material of high viscosity can be caused to positively penetrate between the core wires by pressurizing, and therefore even before the water stopping material is completely cured, the process can shift to the next step, and the productivity can be enhanced.

In the water stopping apparatus of the above (8), after the water stopping material is caused to penetrate the core wires by pressurizing the interior of the pressurizing space, the excess water stopping material within the pressurizing space can be discharged, and therefore a cumbersome operation for removing the excess water stopping material by wiping after the water stopping material is caused to penetrate the core wires can be made unnecessary, and the efficiency of the water stopping operation can be enhanced.

In the water stopping apparatus of the above (9), the sealing material is brought into intimate contact with other portion of the terminal than the portion thereof press-clamped to the exposed portion of the core wires to thereby hermetically seal the other portion, and therefore the water stopping material can be easily and positively prevented from depositing on the bolt fastening plate to be bolt fastened as the contact of the terminal, etc, and the water stopping performance can be imparted while maintaining a good conducting condition of the terminal.

In the water stopping apparatus of the above (10), the positioning pin which can be passed through the fixing hole in the terminal is formed on the one die, and therefore the wire harness can be quite easily positioned and mounted on the die.

In the water stopping method of the present invention, part of the wire harness is held between the pair of dies mated with each other, and the exposed portion of the core wires is located within the pressurizing space formed between the dies, and is sealed, and the water stopping material is filled in this pressurizing space, and further the interior of the pressurizing space is pressurized, and therefore the periphery of the exposed portion of the core wires is covered with the water stopping material filled in the pressurizing space, and this water stopping material is pressurized, and can be caused to positively forcibly penetrate the wire cores.

Therefore, even in the case where the sheathed wire has the large diameter or in the case where a plurality of sheathed wires are bundled together, the water stopping material can be caused to sufficiently penetrate without additionally supplying the water stopping material and without inviting a disadvantage that there develops an area where the water stopping material does not reach the core wires, and the good water stopping effect can be obtained.

Furthermore, the water stopping material supplied to the end portion of the core wires will not drip therefrom, and therefore the cumbersome operation for removing such dripped water stopping material can be made unnecessary.

Furthermore, the water stopping material is caused to forcibly penetrate the core wires by pressurizing, and therefore the water stopping material can be caused to satisfactorily penetrate even if the facility is not massive, and the facility cost can be reduced. Particularly, the water stopping material of high viscosity can be caused to positively penetrate between the core wires by pressurizing, and therefore even before the water stopping material is completely cured, the process can shift to the next step, and the productivity can be enhanced.

Furthermore, in the wire harness of the present invention, there can be provided the wire harness of high quality and safety in which the water stopping of the exposed portion of the core wires at the end portion is positively effected by the water stopping material.

Furthermore, in the water stopping apparatus of the present invention, part of the wire harness is held between the pair of dies mated with each other, and the exposed portion of the core wires is located within the pressurizing space formed between the dies, and is sealed, and the water stopping material is filled in this pressurizing space, and further the interior of the pressurizing space is pressurized, and by doing so, the periphery of the exposed portion of the core wires is covered with the water stopping material filled in the pressurizing space, and this water stopping material is pressurized, and can be caused to positively forcibly penetrate the wire cores.

Therefore, even in the case where the sheathed wire has the large diameter or in the case where a plurality of sheathed wires are bundled together, the water stopping material can be caused to sufficiently penetrate without additionally supplying the water stopping material and without inviting a disadvantage that there develops an area where the water stopping material does not reach the core wires, and the good water stopping effect can be obtained.

Furthermore, the water stopping material supplied to the end portion of the core wires will not drip therefrom, and therefore the cumbersome operation for removing such dripped water stopping material can be made unnecessary.

Furthermore, the water stopping material is caused to forcibly penetrate the core wires by pressurizing, and therefore the water stopping material can be caused to satisfactorily penetrate even if the facility is not massive, and the facility cost can be reduced. Particularly, the water stopping material of high viscosity can be caused to positively penetrate between the core wires by pressurizing, and therefore even before the water stopping material is completely cured, the process can shift to the next step, and the productivity can be enhanced.

BRIEF DESCRIPTION OF THE DRAWINGS

The object and advantages of the present invention will become more manifest by description in DETAILED DESCRIPTION OF THE PREFERRED EMBODIMENTS with reference to the accompanying drawings.

DETAILED DESCRIPTION OF THE PREFERRED EMBODIMENTS

A preferred embodiment of the present invention will now be described in detail with reference to the drawings.

Here, taking as an example a wire harness comprising one sheathed wire having a plurality of core wires and an insulating sheath formed around the periphery of a bundle of these core wires, and a terminal press-clamped to an exposed portion of the bundle of core wires exposed at one end portion of the sheathed wire, description will be made of a water stopping method, the wire harness and a water stopping apparatus of the present invention, in which a water stopping material is caused to forcibly penetrate between the core wires over a region from the exposed portion of the bundle of core wires to the inside of the insulating sheath.

The water stopping method, the wire harness and the water stopping apparatus according to the embodiment of the present invention will be described below with reference to the drawings.

Figure 1:
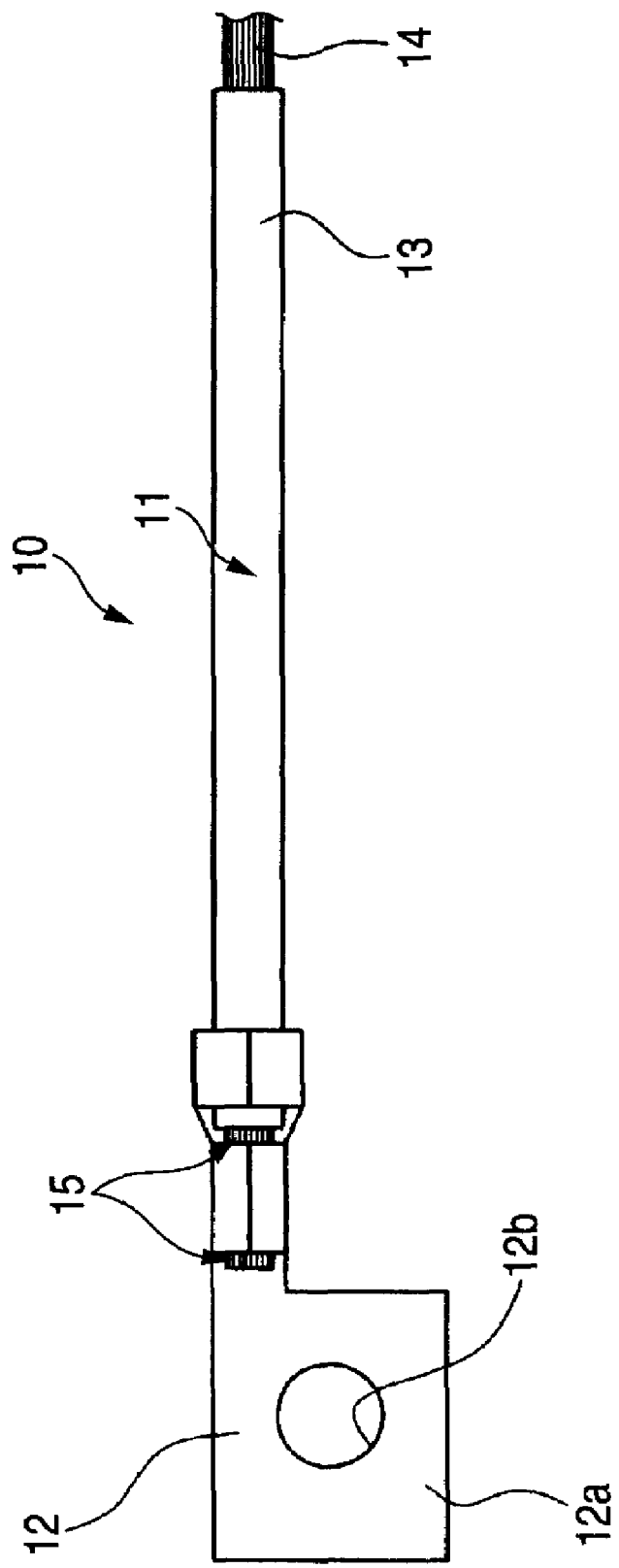
FIG. 1 is a plan view of a sheathed wire to which water stopping is applied by a water stopping method according to an embodiment of the present invention.
Figure 2:
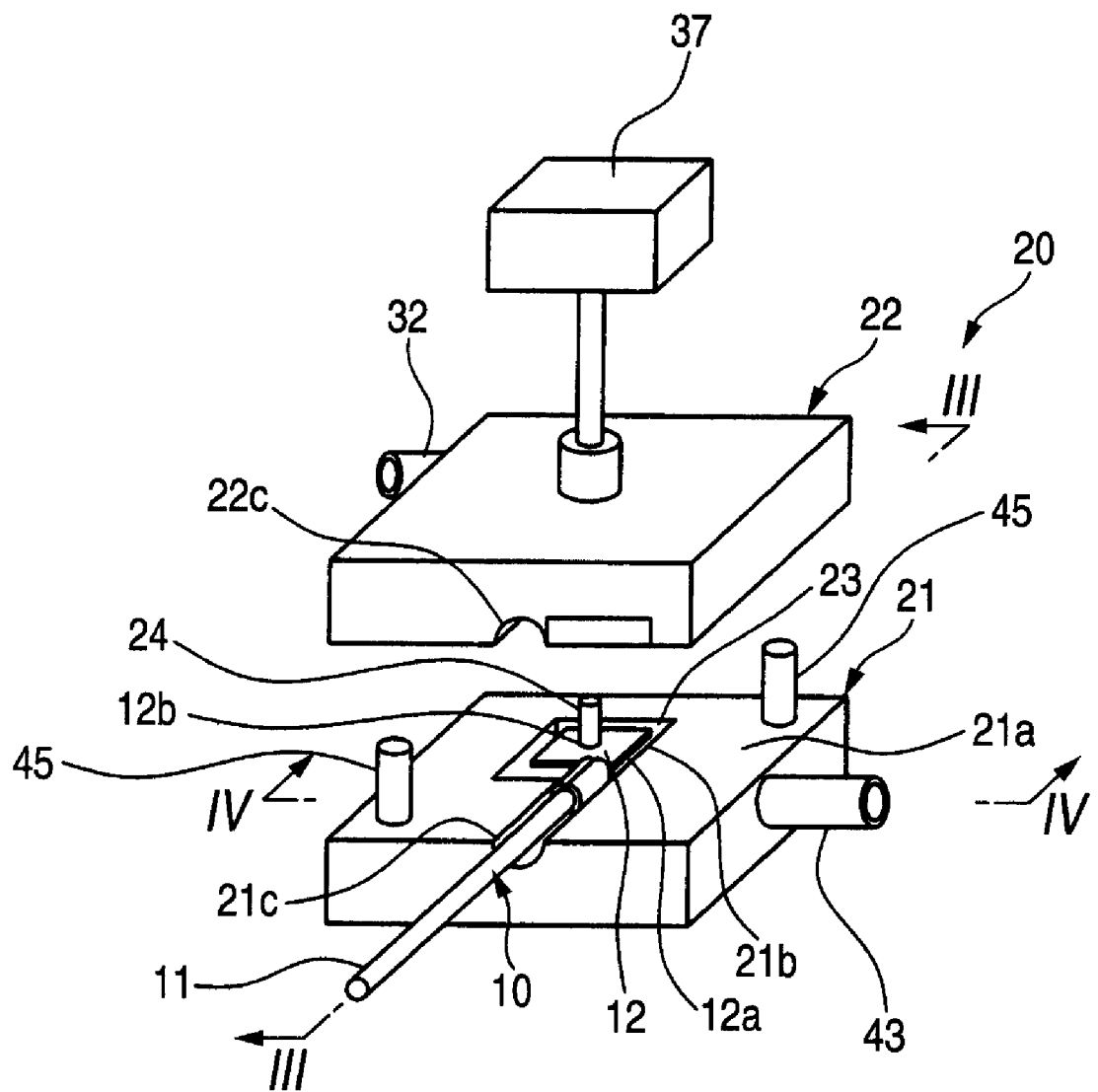
FIG. 2 is a perspective view showing a broad construction of a water stopping apparatus.
Figure 3:
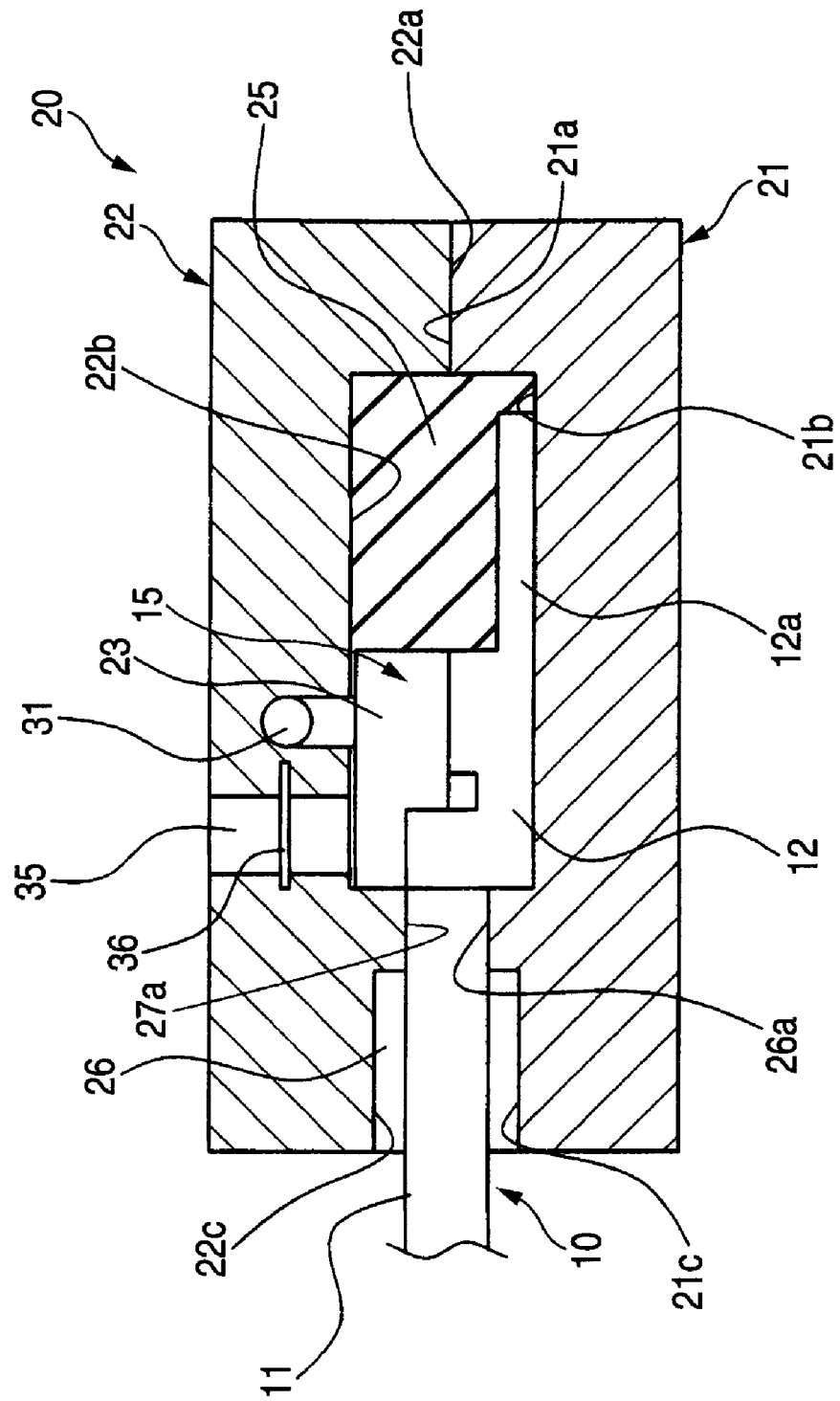
FIG. 3 is a cross-sectional view taken along the line III-III of FIG. 2 in a closed condition of an upper die and a lower die.
Figure 4:
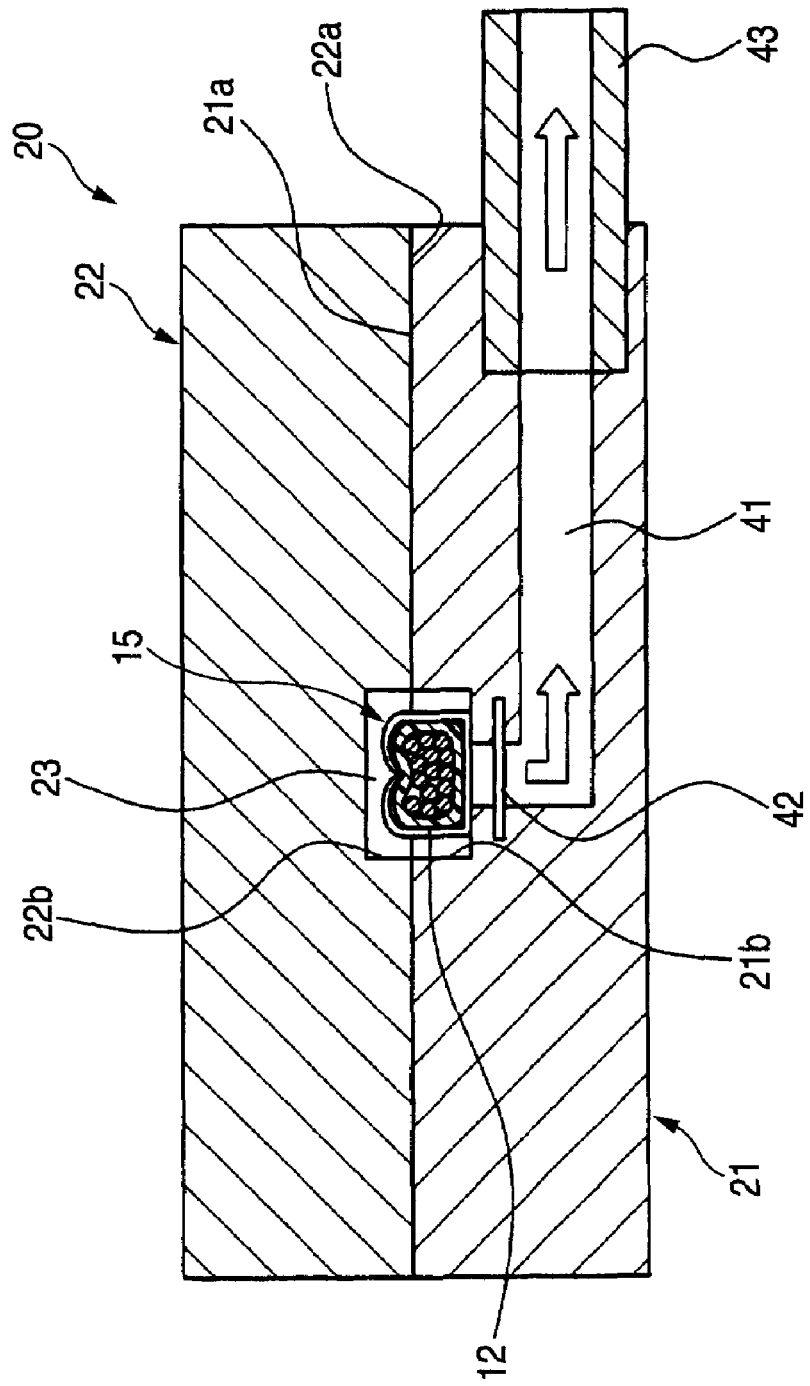
FIG. 4 is a cross-sectional view taken along the line IV-IV of FIG. 2 in the closed condition of the upper die and the lower die.

FIG. 1 is a plan view of the sheathed wire to which water stopping is applied by the water stopping method according to the embodiment of the present invention, FIG. 2 is a perspective view showing the broad construction of the water stopping apparatus, FIG. 3 is a cross-sectional view taken along the line III-III of FIG. 2 in a closed condition of an upper die and a lower die, and FIG. 4 is a cross-sectional view taken along the line IV-IV of FIG. 2 in the closed condition of the upper die and the lower die.

As shown in FIG. 1, the wire harness 10 comprises the sheathed wire 11, and the terminal 12 attached to this sheathed wire 11, and the terminal 12 is press-clamped to the exposed portion 15 of the core wires 14 of the sheathed wire 11 covered with the insulating sheath 13.

As shown in FIGS. 2 to 4, the water stopping apparatus 20 comprises the lower die (die) 21 and the upper die (die) 22 which are adapted to be mated with each other in an upward-downward direction, and the upper die 22 is moved upward downward relative to the lower die 22.

Recesses 21b, 22b are formed respectively in abutment surfaces 21a, 22a of the lower die 21 and upper die 22 which abut airtight against each other in a mutually opposed condition, and by bringing the abutment surfaces 21a, 22a of the upper die 21 and lower die 22 into abutting contact (press-contact) with each other, a pressurizing space 23 defined by the recesses 21b, 22b is formed.

Incidentally, with respect to the abutment surfaces 21a, 22a of the lower die 21 and upper die 22, although good airtightness can be obtained by enhancing dimensional accuracy of flat surfaces thereof, a sheet-like sealing material may be bonded to at least one of these abutment surfaces 21a, 22a, thereby securing the airtightness, or a strap-like packing material may be used so as to secure the airtightness.

One end of the wire harness 10 to which the terminal 12 is press-clamped can be received within this pressurizing space 23.

An upwardly-projecting positioning pin 24 is formed in the recess 21b of the lower die 21, and by passing the positioning pin 24 through a bolt passage hole (fixing hole) 12b formed through a bolt fastening plate 12a of the terminal 12 of the wire harness 10, the one end of the wire harness 10 to which the terminal 12 is press-clamped is located in a predetermined position within the pressurizing space 23.

A hermetic sealing material (sealing material) 25 made, for example, of foamed silicone rubber or the like is provided in part of the recess 22b of the upper die 22, and can be held in intimate contact with the bolt fastening plate 12a of the terminal 12 of the wire harness 10 disposed within the pressurizing space 23.

Cross-sectionally arc-shaped groove portions 21c, 22c communicating with outer edges of the recesses 21b, 22b are formed in the abutment surfaces 21a, 22a of the upper die 21 and lower die 22, and by press-contacting the abutment surfaces 21a, 22a of the upper die 21 and lower die 22 with each other, a holding hole 26 which is defined by the groove portions 21c, 22c and communicates with the pressurizing space 23 and the exterior is formed.

The sheathed wire 11 of the wire harness 10 having its one end received in the pressurizing space 23 can be mounted in this holding hole 26.

The groove portions 21c, 22c forming this holding hole 26 are smaller in arc at their edge portions close to the pressurizing space 23 than at their outer edges close to the exterior. Therefore, those portions of the holding hole 26 disposed close to the pressurizing space 23 define smaller-diameter portions 26a, 27a, and can be held in intimate contact with that portion of the insulating sheath 13, disposed near to the terminal 12 of the sheathed wire 11 mounted in the holding hole 26, in an airtight condition. Incidentally, sheet-like sealing materials may be bonded respectively to inner peripheral surfaces of the smaller-diameter portions 26a, 27a so as to secure good airtightness between the smaller-diameter portions 26a, 27a and the insulating sheath 13, or a strap-like packing material may be used so as to secure good airtightness.

An air supply/discharge passage (pressurizing portion) 31 communicating with the pressurizing space 23 is formed in the upper die 22 forming the above water stopping apparatus 10, and an air feed apparatus (pressurizing portion) (which is not shown) comprising, for example, an air (gas) injection supply apparatus usually provided in an ordinary plant and an air supply pipe 32 having a discharge valve are connected to this air supply/discharge passage 31.

And, by feeding the air (which is pressurized gas of a predetermined pressure) into the air supply/discharge passage 31 from the air feed apparatus via the air supply pipe 32, a large pressure difference develops between the inside of the pressurizing space 23 and the outside of the pressurizing space 23, and by opening the discharge valve, the pressure within the pressurized pressurizing space 23 is reduced.

A water stopping material supply passage 35 communicating with the pressurizing space 23 is formed in the upper die 22, and is disposed above the exposed portion 15 of the core wires 14 of the wire harness 10 received within the pressurizing space 23, and this water stopping material supply passage 35 can be opened and closed by an opening/closing valve 36. A water stopping material filling apparatus (filling portion) 37 is adapted to be connected to this water stopping material supply passage 35.

The water stopping material filling apparatus 37 supplies a predetermined amount of water stopping material S (the water stopping material which is in a liquid state or has been changed from a solid state to a liquid state) to the water stopping material supply passage 35.

When the water stopping material S is supplied to the water stopping material supply passage 35 by the water stopping material filling apparatus 37 in an open condition of the opening/closing valve 36 of the water stopping material supply passage 35, the water stopping material S is filled on the periphery of the exposed portion 15 of the core wires 14 of the wire harness 10 within the pressurizing space 23.

A water stopping material discharge passage (discharge portion) 41 communicating with the pressurizing space 23 and the exterior is formed in the lower die 21, and is disposed below the exposed portion 15 of the core wires 14 of the wire harness 10 received within the pressurizing space 23, and this water stopping material discharge passage 41 can be opened and closed by an opening/closing valve 42. A discharge pipe 43 is connected to this water stopping material discharge passage 41, and by opening the opening/closing valve 42, the water stopping material S filled in the pressurizing space 32 is discharged to the discharge pipe 43 via the water stopping material discharge passage 41.

Incidentally, the lower die 21 has pins 45 formed on the abutment surface 21a and projecting toward the upper die 22, and by moving the upper die 22 toward the lower die 21, the pins 45 are inserted into holes (not shown) formed in the upper die 22, so that the lower die 21 and the upper die 22 are superposed together in a mutually-positioned condition. The projecting pins 45 may be provided in a desired number such for example as four according to the need.

Next, description will be made with respect to the case of applying a water stop processing to the wire harness 70.

Figure 5A:
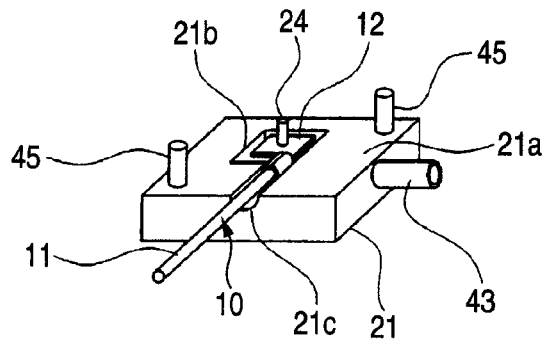
FIGS. 5A to 5E are perspective views respectively showing the steps of applying a water stop processing to a wire harness.
Figure 5B:
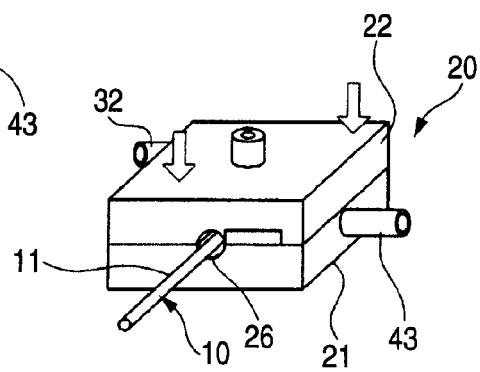
Figure 5C:
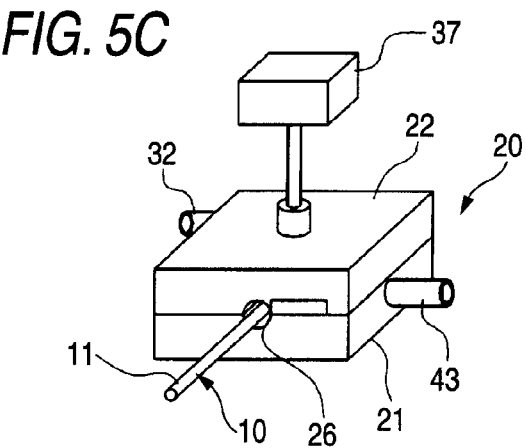
Figure 5D:
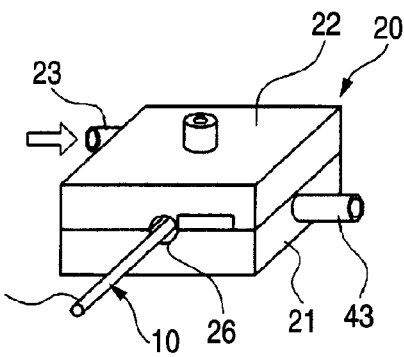
Figure 5E:
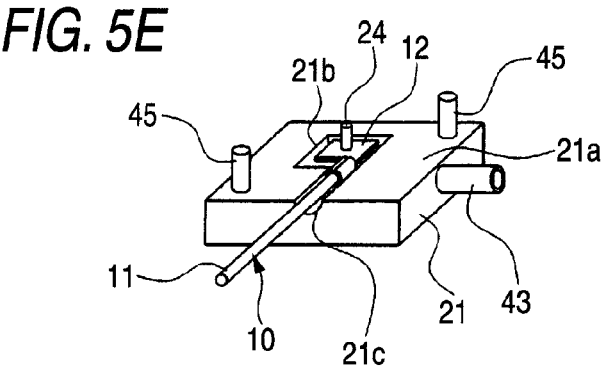
Figure 6:
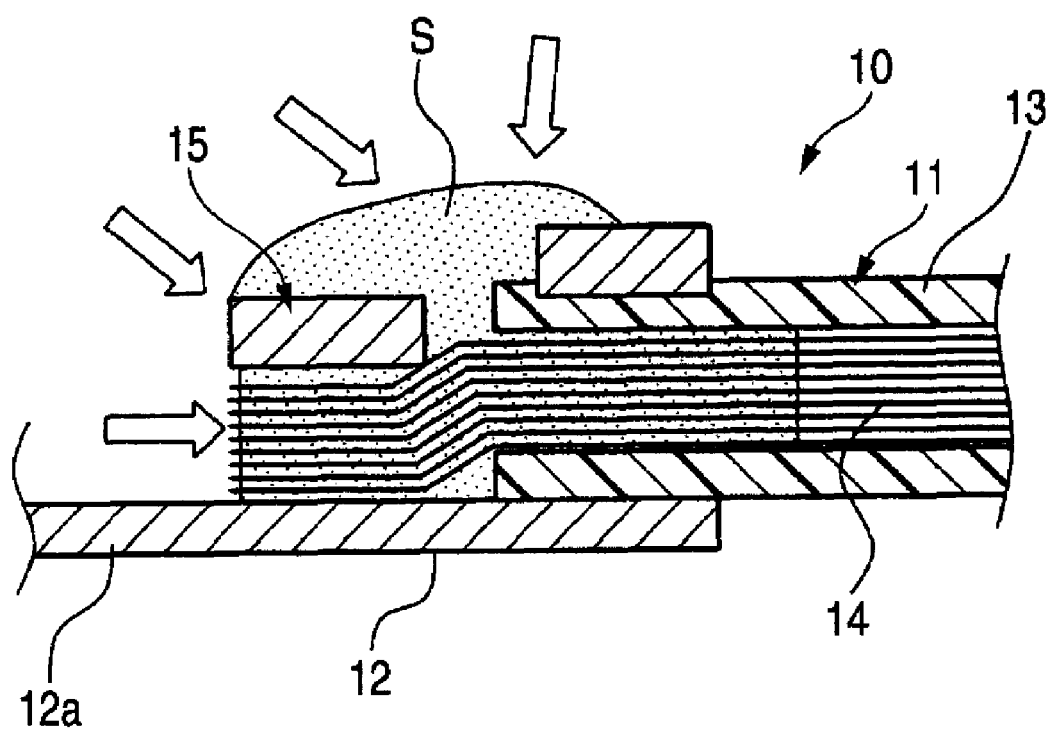
FIG. 6 is a cross-sectional view showing a water stopping material-penetrating condition at an exposed portion of core wires.

FIGS. 5A to 5E are perspective views respectively showing the steps of applying the water stop processing to the wire harness, and FIG. 6 is a cross-sectional view showing a water stopping material-penetrating condition at the exposed portion of the core wires.

First, as shown in FIG. 5A, one end portion of the sheathed wire 11 to which the terminal 12 is already connected, that is, one end portion of the wire harness 10, is mounted on the recess 21b of the lower die 21 while inserting the positioning pin 24 of the lower die 21 into the bolt passage hole 12b in the bolt fastening plate 12a of the terminal 12, and also the sheathed wire 11 is disposed in the groove portion 21c of the lower die 21.

Then, as shown in FIG. 5B, by moving the upper die 22 downward, the upper die 22 is superposed on the lower die 21 while inserting the pins 45 of the lower die 21 into the holes in the upper die 22, and the upper die 22 is pressed against the lower die 21 by a press operated by the air or a hydraulic pressure, etc.

By doing so, the abutment surfaces 21a, 22a of the lower die 21 and upper die 22 abut against each other in an airtight manner, and the pressurizing space 23 defined by the recesses 21b, 22b is formed, and also the holding hole 26 defined by the groove portions 21c, 22c is formed.

As a result, the one end of the wire harness 10 at which the terminal 12 is provided is disposed in the predetermined position within the pressurizing chamber 23, and the portion of the sheathed wire 11 near to the one end thereof is disposed within the holding hole 26. At this time, also, the hermetic sealing material 25 provided in part of the recess 22b of the upper die 22 is held in intimate contact with the bolt fastening plate 12a of the terminal 12 of the wire harness 10 disposed within the pressurizing space 23, and also the smaller-diameter portions 26a, 27a of the holding portion 26 are held in intimate contact with the insulating sheath 13 of the sheathed wire 11 in an airtight condition.

Therefore, the pressurizing space 23 is sealed in such a condition that the exposed portion 15 of the core wires 14 at the one end of the wire harness 10 at which the terminal 12 is provided is received in this pressurizing space.

Then, as shown in FIG. 5C, in an open condition of the opening/closing valve 36 of the water stopping material supply passage 35, the water stopping material S is filled in the pressurizing space 23 by the water stopping material filling apparatus 37 connected to this water stopping material supply passage 35, and after a predetermined amount of water stopping material S is filled, the opening/closing valve 36 is closed.

In this condition, as shown in FIG. 5D, the air which is pressurized gas is fed into the pressurizing space 23 via the air supply/discharge passage 31 by the air feed apparatus.

By doing so, a large pressure difference develops between the inside of the pressurizing space 23 and the outside of the pressurizing space 23, and the water stopping material S filled in the pressurizing space 23 is forcibly fed in between the core wires 14 from the exposed portion 15 of the core wires 14 toward the other end.

Here, the exposed portion 15 of the core wires 14 is mounted within the pressurizing space 23, and the water stopping material S is filled in this pressurizing space 23, and the periphery of the exposed portion 15 of the core wires 14 is covered with the water stopping material S, and the interior of the pressurizing space 23 is pressurized, and therefore the water stopping material S is fed in between the core wires 14 from the whole of the periphery of the exposed portion 15 thereof, and is caused to positively penetrate without forming an area where the water stopping material S does not reach the core wires 14, as shown in FIG. 6.

At this time, the hermetic sealing material 25 is held in intimate contact with the bolt fastening plate 12a of the terminal 12 of the wire harness 10, and therefore the water stopping material S is prevented from depositing on the fastening plate portion 12a of this terminal 12.

When the water stopping material S sufficiently penetrates the core wires 14, the supply of the pressurized gas into the pressurizing space 23 by the air feed apparatus is stopped, and further the discharge valve of the air supply pipe 32 is opened, thereby reducing the pressure within the pressurizing space 23.

When the pressure of the pressurizing space 23 is reduced, the opening/closing valve 42 of the water stopping material discharge passage 41 is opened. By doing so, the excess water stopping material S within the pressurizing space 23 is fed to the water stopping material discharge passage 41, and is discharged to the discharge pipe 43. At this time, (A) the excess water stopping material S may be discharged to the discharge pipe 43 by pressurizing it by the pressurized gas from the air supply pipe 32. Also, (B) Before "the supply of the pressurized gas into the pressurizing space 23 by the air feed apparatus is stopped, and further the discharge valve of the air supply pipe 32 is opened, thereby reducing the pressure within the pressurizing space 23" as described above and in the process of pressurizing the pressurizing space 23, the opening/closing valve 42 of the water stopping material discharge passage 41 may be opened so as to discharge the excess water stopping material S to the discharge pipe 43. When one of the two methods (A) and (B) is used, the excess water stopping material S will not remain in the pressurizing space 23. Namely, when at least one of the two methods is used, the unnecessary water stopping material S deposited on the terminal 12 can also be removed. Incidentally, if both of the two methods are used, this is, needless to say, more effective in discharging the unnecessary water stopping material S.

Thereafter, as shown in FIG. 5E, the upper die 22 is moved upward to thereby open the pressurizing space 23, and the wire harness 10 having the water stopping material S penetrating the core wires 14 is taken out from the recess 21b of the lower die 21 forming the pressurizing space 23.

Thus, in the above embodiment, part of the wire harness 10 is held between the pair of lower die 21 and upper die 22 opposed to each other, and the exposed portion 15 of the core wires 14 is disposed within the pressurizing space 23 formed between the lower die 21 and the upper die 22, and is sealed, and the water stopping material S is filled in this pressurizing space 23, and further the interior of the pressurizing space 23 is pressurized, and therefore the periphery of the exposed portion 15 of the core wires 14 is covered with the water stopping material S filled in the pressurizing space 23, and this water stopping material S is pressurized, and can be caused to positively and forcibly penetrate the core wires 14.

Therefore, even in the case where the sheathed wire 11 has the large diameter or in the case where a plurality of sheathed wires 11 are bundled together, the water stopping material S can be caused to sufficiently penetrate without additionally supplying the water stopping material S and without inviting a disadvantage that there develops an area where the water stopping material S does not reach the core wires 14, and the good water stopping effect can be obtained.

Therefore, there can be obtained the wire harness 10 of high quality and safety in which the water stopping of the exposed portion 15 of the core wires 14 is positively effected by the water stopping material S.

Furthermore, the water stopping material S supplied to the exposed portion 15 of the core wires 14 will not drip therefrom, and therefore a cumbersome operation for removing such dripped water stopping material S can be made unnecessary.

Furthermore, after the water stopping material S is caused to penetrate the core wires 14 by pressurizing the interior of the pressurizing space 23, the excess water stopping material S within the pressurizing space 23 is discharged, and therefore a cumbersome operation for removing the excess water stopping material S by wiping after the water stopping material S is caused to penetrate the core wires 14 can be made unnecessary, and the efficiency of the water stopping operation can be enhanced, and also a resources-saving design can be achieved.

Furthermore, the terminal 12 is located within the pressurizing space 23, and also the hermetic sealing material 25 is held in intimate contact with other portion of the terminal 12 than the portion thereof press-clamped to the exposed portion 15 of the core wires 14 to thereby hermetically seal the other portion, and therefore the water stopping material S can be prevented from depositing on the bolt fastening plate 12a to be bolt fastened as a contact of the terminal 12, etc., and the good water stopping performance can be imparted while maintaining a good conducting condition of the terminal 12.

Furthermore, the positioning pin 24 which can pass through the bolt passage hole 12b of the terminal 12 is provided at the lower die 21, and therefore by inserting the positioning pin 24 into the bolt passage hole 12b of the terminal 12, the wire harness 10 can be quite easily positioned and mounted on the lower die 21.

Furthermore, the water stopping material S is caused to forcibly penetrate the core wires by pressurizing, and therefore the water stopping material S can be caused to satisfactorily penetrate even if the facility is not massive, and the facility cost can be reduced. Particularly, the water stopping material S of high viscosity can be caused to positively penetrate between the core wires by pressurizing, and therefore even before the water stopping material S is completely cured, the process can shift to the next step, and the productivity can be enhanced.

Furthermore, the smaller-diameter portions 26a, 27a which are held in intimate contact with the insulating sheath 13 to seal the holding hole 26 are provided in the vicinity of that portion of the terminal 12 press-fastened to the insulating sheath 13, and therefore the inside of the insulating sheath 13 can be bulged by the water stopping material S forcibly fed in between the core wires 14 from the pressurizing space (23) side and passed through the smaller-diameter portions 26a, 27a within the insulating sheath 13, and the water stopping material S can be satisfactorily fed in between the core wires 14, and can be caused to penetrate.

Figure 7:
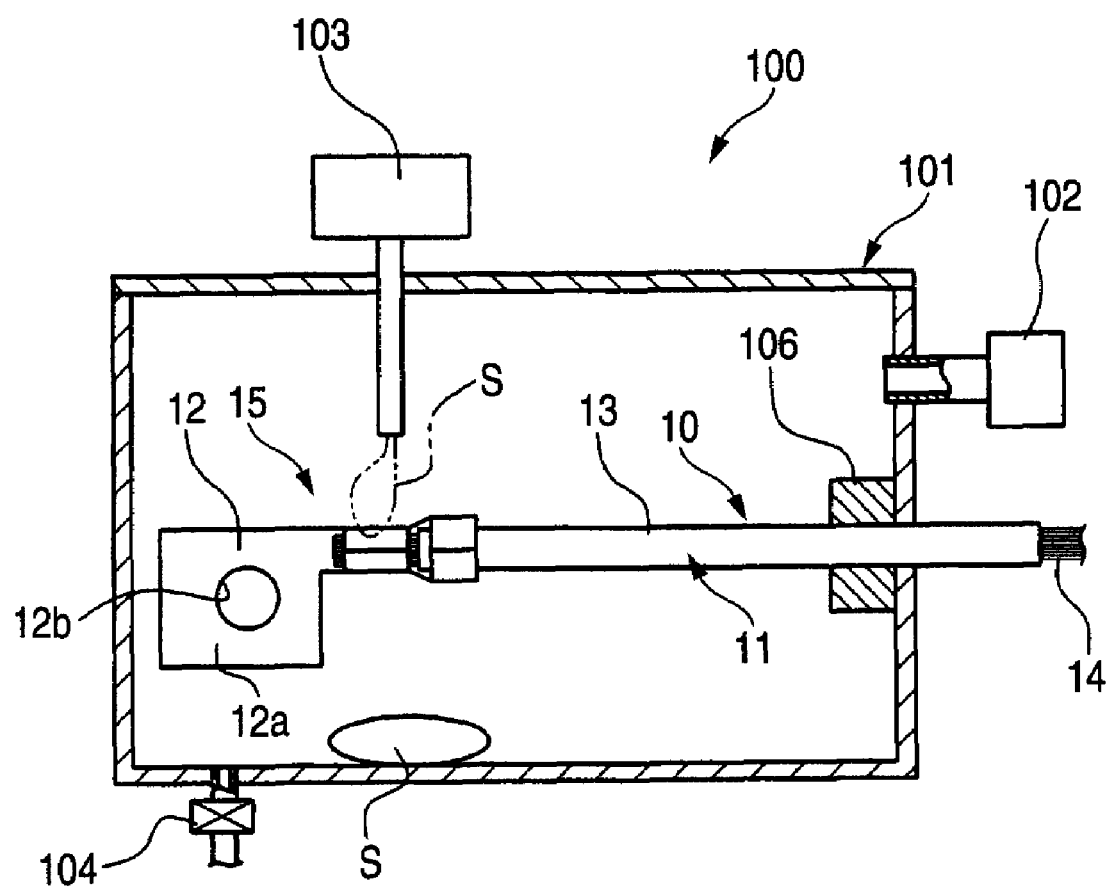
FIG. 7 is a cross-sectional view showing a reference example of a water stopping apparatus.

Here, for explaining further advantages of the present invention, a reference example is shown in FIG. 7. FIG. 7 is a cross-sectional view showing a reference example of a water stopping apparatus, and FIG. 8 is a cross-sectional view showing a water stopping material-penetrating condition at an exposed portion of core wires in a water stop processing by the water stopping apparatus shown in FIG. 7.

As shown in FIG. 7, this water stopping apparatus 100 comprises a pressurizing chamber 101 for receiving a portion of a sheathed wire 11 including the exposed portion 15 of the core wires 14 and also for sealing it, an air feed apparatus 102 connected to the pressurizing chamber 101 so as to feed pressurized gas into the pressurizing chamber 101 from the exterior of the pressurizing chamber 101 so that a pressure difference can develop between the inside of the pressurizing chamber 101 and the outside of the pressurizing chamber 101, a water stopping material dropping apparatus 103 provided above the exposed portion 15 of the core wires 14 so as to drop a water stopping material S on this exposed portion 15, and an exhaust portion 104.

In this water stopping apparatus 100, one end portion of the sheathed wire 11 is received within the pressurizing chamber 101, and is positioned and fixed in a predetermined position by a suitable fixing member (not shown), and in this condition the water stopping material S is caused to drop on the exposed portion 15 of the core wires 14 while pressurizing the pressurizing chamber 101. Then, after the water stopping material S penetrates the core wires 14, the pressurizing of the pressurizing chamber 101 by the air feed apparatus 102 is stopped, and the pressure within the pressurizing chamber 101 is reduced through the exhaust portion 104, and the wire harness 10 is taken out from the pressurizing chamber 101.

Figure 8:
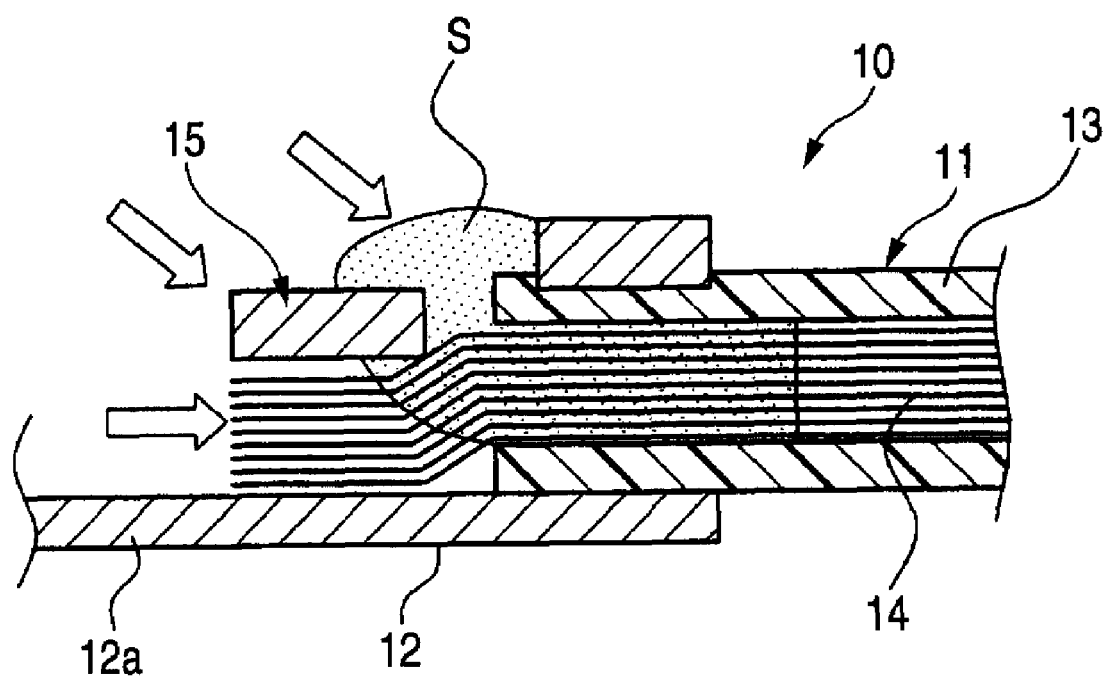
FIG. 8 is a cross-sectional view showing a water stopping material-penetrating condition at an exposed portion of core wires in a water stop processing by the water stopping apparatus shown in FIG. 7.
Figure 9:
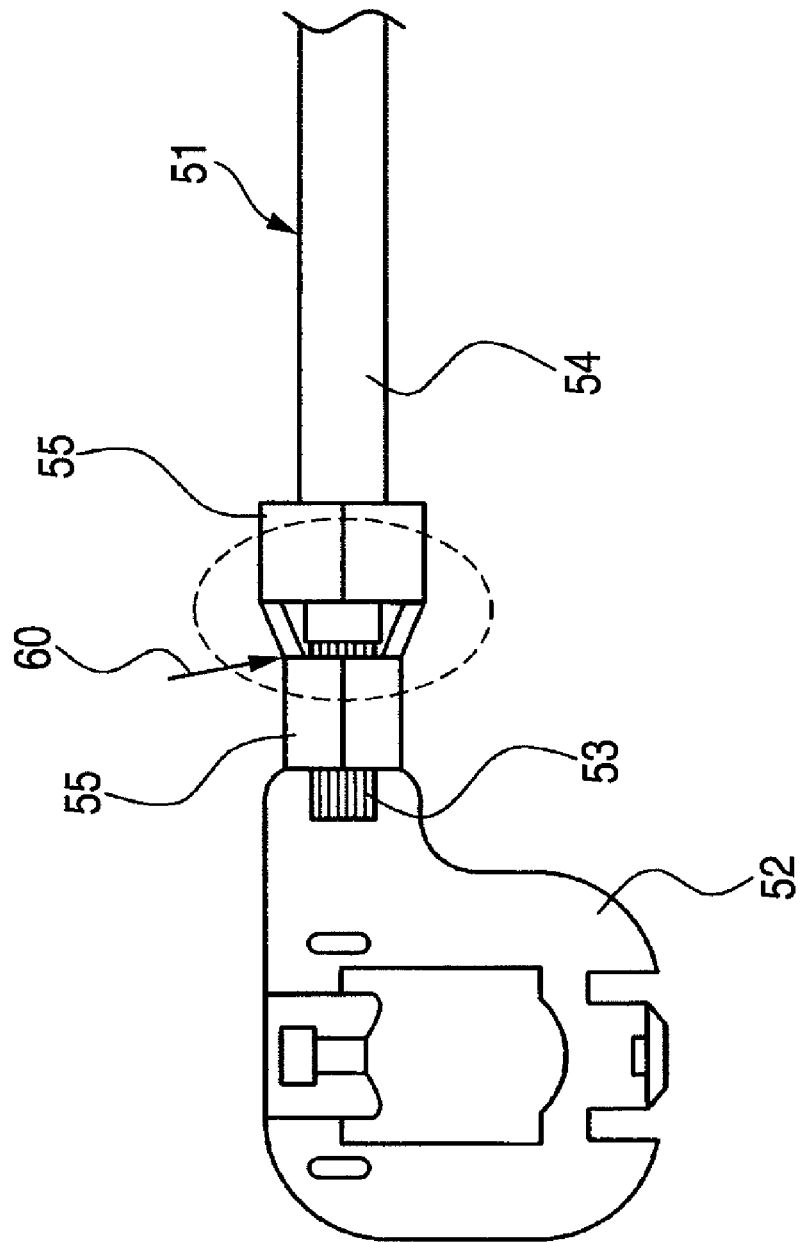
FIG. 9 is a view explanatory of a conventional water stopping method.

Incidentally, in the case of applying the water stop processing using this water stopping apparatus 100, the exposed portion 15 of the core wires 14 can not be completely covered with the dropped water stopping material S, and therefore there develops an area where the water stop material S does not reach the core wires 14, so that the water stopping effect is insufficient, as shown in FIG. 8.

Furthermore, there are occasions when the water stopping material S dropped on the exposed portions 15 of the core wires 14 drips therefrom, and a cumbersome operation must be carried out for removing the water stopping material S dripped and deposited on a floor surface of the pressurizing chamber 101.

Furthermore, there is a fear that the water stopping material S may deposit on a bolt fastening plate 12a which is to be bolt-fastened as a contact of a terminal 12, so that a defective conduction may develop at the terminal 12.

Furthermore, there is required a cumbersome operation for positioning the wire harness 10 in the predetermined position within the pressurizing chamber 101 by the fixing member, thereby setting the wire harness, and besides in the case of effecting this setting, there is required a cumbersome operation in which the sheathed wire 11 is passed from the inside of the pressurizing chamber 101 to the outside thereof, and further this passed portion is sealed by a sealing material 106 so as to provide airtightness.

Incidentally, the present invention is not limited to the above-mentioned embodiment, and modifications, improvements, etc., can be suitably made. Furthermore, the material, shape, dimensions, numerical values, form, number, disposition, etc., of each of the constituent elements of the above-mentioned embodiment are arbitrary and are not limited.

The present invention is based on Japanese Patent Application (Patent Application No. 2007-018084) filed on Jan. 29, 2007, and the contents thereof are incorporated herein as a reference.

What is claimed is:

1. A water stopping method of causing a water stopping material to penetrate exposed core wires of a sheathed wire forming a wire harness, the method comprising:

arranging a portion of the wire harness between a pair of dies opposed to each other;

holding the portion of the wire harness between the pair of dies to seal an exposed portion of the core wires arranged within a pressurizing space formed between the dies;

filling the water stopping material in the pressurizing space; and pressurizing the interior of the pressurizing space by feeding a gas therein.

2. The water stopping method according to claim 1, wherein after the pressurizing process, the excess water stopping material within the pressurizing space is discharged.

3. The water stopping method according to claim 1, wherein before the sealing process, a terminal is press-clamped to the exposed portion of the core wires of the sheathed wire.

4. The water stopping method according to claim 3, wherein in the sealing process, a first end portion of the terminal is arranged within the pressurizing space, and a second end portion of the terminal is hermetically sealed so that the water stopping material is not deposited on the second end portion of the terminal.

5. The water stopping method according to claim 4, wherein a sealing material is adhered to the second end portion of the terminal to hermetically seal the second end portion.

6. A wire harness wherein with a water stopping method as defined in claim 1, the water stopping of the exposed portion of the core wires to which the terminal is press-clamped is effected by the water stopping material.

7. A water stopping method of causing a water stopping material to penetrate exposed core wires of a sheathed wire forming a wire harness, the method comprising:

arranging a portion of the wire harness between a pair of dies opposed to each other;

holding the portion of the wire harness between the pair of dies to seal an exposed portion of the core wires arranged within a pressurizing space formed between the dies;

filling the water stopping material in the pressurizing space; and then pressurizing the interior of the pressurizing space by feeding a gas therein so that the water stopping material penetrates the core wires.

8. The water stopping method according to claim 7, wherein after the pressurizing process, the excess water stopping material within the pressurizing space is discharged by opening a water stopping material discharge passage.

* * * * *